(12) United States Patent
Nickel

(10) Patent No.: US 6,723,406 B2
(45) Date of Patent: Apr. 20, 2004

(54) MASKING TAPE AND ITS USE

(75) Inventor: Oliver Nickel, Hamburg (DE)

(73) Assignee: tesa AG, Hamburg (DE)

( * ) Notice: Subject to any disclaimer, the term of this patent is extended or adjusted under 35 U.S.C. 154(b) by 0 days.

(21) Appl. No.: 09/844,084

(22) Filed: Apr. 27, 2001

(65) Prior Publication Data

US 2002/0122936 A1 Sep. 5, 2002

(30) Foreign Application Priority Data

Apr. 29, 2000 (DE) .......................... 100 21 242

(51) Int. Cl.⁷ .............................. B32B 9/00; B32B 7/12
(52) U.S. Cl. .................... 428/40.1; 428/40.1; 428/41.7; 428/41.8; 428/42.3; 428/343
(58) Field of Search .......................... 428/40, 342–345, 428/352–355, 335, 906, 341, 40.1, 41.7, 41.8, 42.3, 343; 427/208.4–208.8, 143; 442/149, 181

(56) References Cited

U.S. PATENT DOCUMENTS

| | | | | |
|---|---|---|---|---|
| 4,358,494 A | * | 11/1982 | Akimoto et al. | 428/41.3 |
| 5,935,669 A | * | 8/1999 | Leeuwenburgh | 428/40.1 |
| 6,296,904 B1 | | 10/2001 | Zimmermann | 427/208.4 |

FOREIGN PATENT DOCUMENTS

| | | |
|---|---|---|
| DE | 296 17 896 U1 | 1/1997 |
| EP | 0 953 620 A1 | 11/1999 |
| EP | 0 99 251 A2 | 5/2000 |

OTHER PUBLICATIONS

U.S. patent application Publication US 2001/0034173 A1, Zimmermann "Painter's Masking Tape and its use"; Oct. 25, 2001, Copy of Specification from U.S. application Ser. No. 09/431,849, filed Nov. 2, 1999.

* cited by examiner

Primary Examiner—Terrel Morris
Assistant Examiner—Lynda M Salvatore
(74) Attorney, Agent, or Firm—Norris McLaughlin & Marcus

(57) ABSTRACT

A masking tape formed from (a) a heat-resistant adhesive tape having a paper backing and pressure-sensitive adhesive composition, (b) a masking material laminated in an edge region of the pressure-sensitive adhesive composition, having good adhesion to paint and made of a woven fabric, a nonwoven fabric or a sheet capable of adhering to paint, and (c) a masking sheet which covers the masking material and is laminated on the same edge region of the pressure-sensitive adhesive composition the masking tape can be used to mask a part, for example, an automobile part, during a surface treatment, for example, painting, of the part.

18 Claims, 1 Drawing Sheet

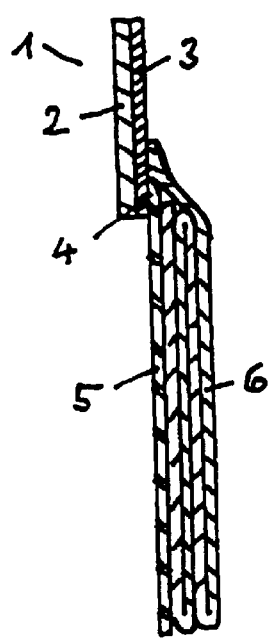
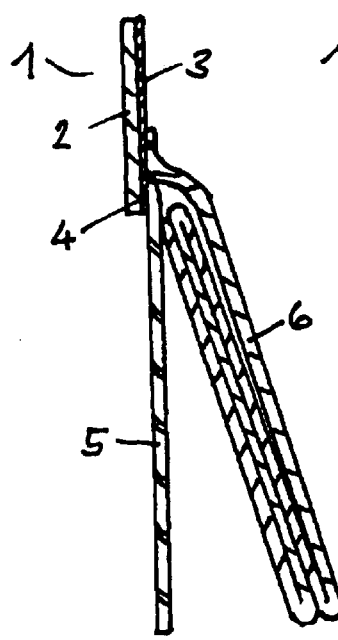
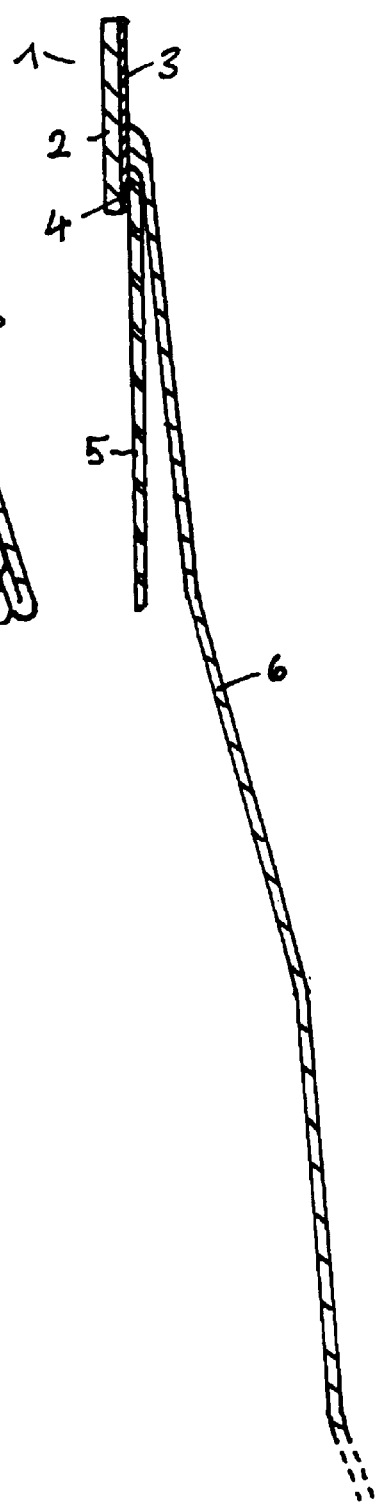

MASKING TAPE AND ITS USE

The invention relates to a masking tape, especially for covering certain parts when painting cars, as well as to the use of this tape. In particular, masking is provided for medium to large surfaces, which must not come into contact with paint in touch-up work in automobile paint shops.

Such masking tapes or shrouds are known and their use is widespread. Standard materials are, for example, 50 g weight special papers or newsprint, and also folded plastic hoods (approximately 30 μm thick or 30 g/m$^2$) or "endless" sheets from a large roll (2 m wide) as well as "2 in 1" systems as folded polyethylene sheets with adhesive tape, including also polyethylene-coated papers with adhesive tape.

Such masking systems must fulfill especially the following requirements:

Paint Adhesion—After oven drying, the paint must not fall from the masking material onto the fresh paint.

Waste—A small volume of waste is important, since it determines the price of disposal.

Number of Persons—Normally, an automobile is painted by only one person. It should therefore be easy for one person to apply the masking.

Number of Steps—Few steps, which can be carried out quickly, are required.

Material Consumption—An adhesive tape, capable of withstanding the temperatures encountered, is required for applying the masking. The consumption of masking material and adhesive tape should be small.

The previously known masking tapes and the like fulfill these requirements only to a limited extent.

|  | Advantages | Disadvantages |
| --- | --- | --- |
| Papers | Optimum paint adhesion even when paint is applied heavily in the edge region<br>Low costs | Paint bleeds through especially when applied more heavily in the edge region<br>Masking must be equipped subsequently with adhesive tape<br>Not dispensed directly on the vehicle. Therefore too much material is consumed at times, since sometimes too much or too little paper is dispensed. |
| Shrouds | No paint bleeds through<br>The whole of the vehicle is covered<br>The plastic shroud can easily be incised, in order to expose the area to be painted | Paint adhesion not optimum<br>Relatively expensive<br>High material consumption, since the whole automobile must always be covered<br>Hoods generally are steeped in paint. As a result, the automobiles cannot be marshaled in the covered state. |
| Endless sheets | See shrouds | See shrouds (exception: material consumption, since automobiles can also be covered partially) |
| 2 in 1 - Systems folded sheets with masking tape | Paint does not bleed through sheet<br>No paint bleed-through and adequate adhesion in the case of polyethylene-coated paper<br>Dispensed at vehicle<br>Convenient<br>Slight | Optimum result only when both products are used (that is, paper in the edge region and sheet for larger surface).<br>Both products are always furnished with adhesive tape. |

|  | Advantages | Disadvantages |
| --- | --- | --- |
| Polyethylene-coated paper with masking tape | Little waste since polyethylene film is only 10 μm thick | Due to the coating (composite) and the bleaching (white), paper is not environmentally friendly and is expensive. |

It was an object of the invention to provide a remedy here and, in particular, to create a masking tape, for which an inexpensive, absorptive or adhesive material can be used, which has, in particular, good adhesion for paint, etc. (paint adhesion).

This objective is accomplished by a masking tape, which is characterized in greater detail in the claims.

With that, the invention combines the very good properties of woven fabric, nonwoven fabric or adhesive sheets with regard to paint adhesion and the very good properties of sheets in relation to reliability against paint bleed-through in a convenient product.

With that, the product consists of three products in one and therefore can be referred to as a "3 in 1" product. The components are masking material with good paint adhesion, adhesive tape with a paper backing and a sheet. As masking material, woven fabric, nonwoven fabric or adhesive films with good paint adhesion are preferred.

Masking material: 20 to 40 cm wide

Sheet: particularly 10 μm (=10 g/m$^2$) pretreated (corona) polyethylene sheet (surface tension approximately 38 dynes), width of sheet, depending on application, between 500 mm and 2000 mm, variable length, usually between 10 and 30 m.

Adhesive tape: approximately 25 mm wide, heat resistant (approximately 80° C.)

Adhesive tape for the car painter (for example, tesa 4309 etc.)

The masking material with good paint adhesion is used to absorb and hold heavier paint application reliably in the edge region of the painting even after oven drying, so that paint cannot drop onto the still soft, freshly painted surface. The sheet is prepared by the corona treatment preferably so that a paint mist is fixed securely. Furthermore, the sheet prevents bleed-through of the paint through the paper onto the painted surface.

Especially materials from ordered or disordered (needled or spun nonwoven) yarn/fibers, such as polyester or cotton with a weight of approximately 50 to 150 g/cm$^2$ are suitable as woven or nonwoven material.

In particular, there are the following product advantages:

Optimum paint adhesion a) in the critical edge region by the masking material with good paint adhesion and b) on the remaining masked surface by the specially pretreated sheet.

Optimum protection against paint bleed-through by the film.

Appreciably less waste from the thin sheet (approximately a fifth of that from 50 g weight paper).

Handling by only one person, due to the convenient format and the pre-manufactured product.

Optimum material consumption a) in relation to the masking material due to the direct dispensing at the vehicle and b) with respect to the adhesive tape because of the standardized width, such as 25 mm.

Time saved by few working steps (3 in 1).

Product advantages over the "2 in 1" system:

Inexpensive material can be used for the edge region, especially woven or nonwoven material with good absorption for the paint.

Coverage of the edge region and of the large surface in one step.

Adhesive tape is required only once.

In the following, the invention is described by means of an example without, however, being limited unnecessarily. In the drawing, FIG. 1 shows a diagrammatic side view of an inventive masking tape with a folded masking sheet, FIG. 2 shows a view, similar to that of FIG. 1, however with a partially unfolded masking sheet and FIG. 3 shows a view, like that in FIG. 1, the masking sheet being fully unfolded now.

In detail, FIGS. 1 to 3 show an adhesive tape 1 of a paper backing 2 and a pressure-sensitive adhesive composition 3. In particular, a heat resistant, so-called masking tape, which withstands oven drying at temperatures up to 130° C. (1 hour), such as tesa 4309 of Beiersdorf AG, Germany, is suitable for this purpose. It can be obtained commercially, has a width of 25 mm, a thickness of 170 $\mu$m and an adhesion to steel of 8.75 N/25 mm. A disordered needled nonwoven of polyester fibers, with a weight of 70 g/m$^2$ and a width of 30 cm is glued to the one edge region 4 of this adhesive tape (1) in a width of 3 mm. Next to this masking paper 5, a masking sheet 6, namely a 10 $\mu$m thick polyethylene sheet, which has been treated with a corona, is 1 mm wide and folded, is glued onto the next part of this edge region 4 in a width of 3 mm.

The folding of the masking sheet 6 is known and is undertaken particularly in the manner known and familiar to the user, the whole of the masking tape being rolled up into a roll for easier handling. Preferably, the folding is carried out so that the folds of the masking sheet 6 lie on top of one another in the direction of the masking material 5 and are held by the latter in the folded state. This has the advantage, for example, that an automobile, equipped with an inventive masking tape and prepared for painting, can still be moved and entered, while the masking tape is installed but not yet unfolded. Only when the automobile is at its appointed place at the appointed time, is the masking tape unfolded by slightly lifting the masking material 5, that is, the masking sheet 6 falls down without the intervention of further measures or work.

What is claimed is:

1. A masking tape comprising
    a) a heat resistant adhesive tape comprising a paper backing and a pressure sensitive adhesive composition,
    b) a masking material, which is laminated in an edge region of the pressure-sensitive adhesive composition, is capable of adhering to paint and consists of a woven fabric, a nonwoven fabric or a sheet capable of adhering,
    c) a masking sheet, which is laminated onto the vary same edge region of the pressure-sensitive adhesive composition,
    d) the masking sheet, covering the masking material on a side thereof.

2. The masking tape of claim 1, wherein the adhesive tape has a heat-resistance at a temperature of up to 130° C.

3. The masking tape of claim 1, wherein the adhesive tape is 15 to 75 mm wide.

4. The masking tape of claim 1, wherein the paper backing is creped, extensible and flexible and adheres to paint and the whole adhesive tape has a thickness of 100 to 250 $\mu$m.

5. The masking tape of claim 1, wherein the masking material is unbleached Kraft paper having a weight of 30 to 40 g/m$^2$ and a width of 15 to 50 cm.

6. The masking tape of claim 1, wherein the masking sheet has a thickness of 7 to 40 $\mu$m consists of polyolefin and has a width of 0.5 to 2 m.

7. The masking tape of claim 1, wherein the masking sheet is folded so that it can be extended along the external dimensions of the masking material and is folded against the masking material in accordion fashion.

8. The masking tape of claim 1, wherein a portion of the edge region of the pressure-sensitive adhesive composition, to which the masking material adheres, is 1 to 5 and mm wide and a portion of the edge region of the pressure-sensitive adhesive composition to which the masking sheet adheres is 1 to 5 mm wide.

9. The masking tape of claim 1, wherein the tape is rolled up into a roll, the masking sheet is folded and the height of the roll corresponds approximately to the width of the masking material plus the width of the adhesive tape.

10. A method comprising applying the masking tape of claim 1 to a part to be masked, and then subjecting said part to a surface treatment.

11. The masking tape of claim 3, wherein the adhesive tape is 19 to 30 mm wide.

12. The masking tape of claim 4, wherein the thickness is 130 to 200 $\mu$m.

13. The masking tape of claim 5, wherein the width is 20 to 40 cm.

14. The masking tape of claim 6, wherein the thickness is 8 to 20 $\mu$m.

15. The masking tape of claim 6, wherein the masking sheet is corona pretreated or consists of polyethylene.

16. The masking tape of claim 8, wherein the portion at the edge region of the pressure-sensitive adhesive composition to which the masking material adheres is 2 to 4 mm wide, or the portion of the edge region of the pressure-sensitive adhesive composition to which the masking sheet adheres is 2 to 4 mm wide.

17. The method of claim 10, wherein the part is an automobile part.

18. The method of claim 10, wherein the surface treatment is painting.

* * * * *

UNITED STATES PATENT AND TRADEMARK OFFICE
CERTIFICATE OF CORRECTION

PATENT NO. : 6,723,406 B2
DATED : April 20, 2004
INVENTOR(S) : Nickel

It is certified that error appears in the above-identified patent and that said Letters Patent is hereby corrected as shown below:

<u>Title page,</u>
Item [57], ABSTRACT,
Line 9, "adhesive composition the masking tape" should read -- adhesive composition. The masking tape" --

<u>Column 4,</u>
Line 1, "vary same" should read -- very same --
Line 24, "1 to 5 and mm" should read -- 1 to 5 mm --

Signed and Sealed this

Sixteenth Day of November, 2004

JON W. DUDAS
*Director of the United States Patent and Trademark Office*